(12) United States Patent
Zhao et al.

(10) Patent No.: US 9,740,319 B2
(45) Date of Patent: Aug. 22, 2017

(54) TOUCH DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 160 days.

(21) Appl. No.: 14/385,020

(22) PCT Filed: Nov. 29, 2013

(86) PCT No.: PCT/CN2013/088151
§ 371 (c)(1),
(2) Date: Sep. 12, 2014

(87) PCT Pub. No.: WO2015/043051
PCT Pub. Date: Apr. 2, 2015

(65) Prior Publication Data
US 2016/0216810 A1   Jul. 28, 2016

(30) Foreign Application Priority Data
Sep. 26, 2013 (CN) .......................... 2013 1 0446156

(51) Int. Cl.
*G06F 3/041* (2006.01)

(52) U.S. Cl.
CPC .......... *G06F 3/0412* (2013.01); *G06F 3/0416* (2013.01); *G09G 2310/0202* (2013.01)

(58) Field of Classification Search
CPC ...... G06F 3/0412; G06F 3/0416; G06F 3/044; G06F 3/041; G06F 2203/04104;
(Continued)

(56) References Cited

U.S. PATENT DOCUMENTS 5,157,492 A * 10/1992 Tults ........................ H04N 5/04
                                                      348/525
9,477,111 B2 * 10/2016 Kim ..................... G02F 1/13338
(Continued)

FOREIGN PATENT DOCUMENTS

CN     102855044 A     1/2013
CN     102937845 A     2/2013
(Continued)

OTHER PUBLICATIONS

International Search Report Appln. No. PCT/CN2013/088151; Dated Jun. 9, 2014.
(Continued)

*Primary Examiner* — Sanjiv D Patel
(74) *Attorney, Agent, or Firm* — Ladas & Parry LLP

(57) ABSTRACT

The embodiment of the present disclosure discloses a touch display device and a driving method thereof, relates to the display technical field, and can extend the time for the touch display device to perform touch control. The touch display device includes n rows of pixels and divides the n rows of pixels into several display regions, wherein n is a natural number greater than 1, the driving method of the touch display device comprising: after the touch display device sends a display signal to the $i^{th}$ row of pixels, and before the touch display device sends a display signal to the $(i+1)^{th}$ row of pixels, sending a touch control signal, by the touch
(Continued)

display device, to perform touch control on one display region thereamong, wherein 1≤i<n.

14 Claims, 2 Drawing Sheets

(58) Field of Classification Search
CPC . G06F 2203/04808; G06F 2203/04106; G06F 2203/04108; G09G 2310/08; G09G 3/3611; G09G 2340/0435; G09G 5/18; G09G 3/3659; G09G 5/005; G09G 3/3696; G09G 5/12; G02F 1/13338; H04N 5/10; H04N 5/04; H04N 21/4302; H04N 5/08; H04N 5/12; H04N 5/123; H04N 5/926; H04N 9/78; G11C 11/412; G11C 7/02; H03K 19/096; H03K 5/19; H03K 17/73; H03K 4/06; H03K 4/94
See application file for complete search history.

(56) References Cited

U.S. PATENT DOCUMENTS

| | | | |
|---|---|---|---|
| 2011/0102360 A1* | 5/2011 | Chen | G06F 3/0412 345/173 |
| 2011/0210944 A1* | 9/2011 | Chen | G06F 3/0418 345/174 |
| 2012/0044166 A1* | 2/2012 | Mizuhashi | G06F 3/0412 345/173 |
| 2012/0262389 A1* | 10/2012 | Kida | G06F 3/0412 345/173 |
| 2014/0111446 A1* | 4/2014 | Lee | G06F 3/0416 345/173 |
| 2014/0160061 A1* | 6/2014 | Kim | G02F 1/13338 345/174 |
| 2014/0333546 A1* | 11/2014 | Chang | G06F 3/041 345/173 |
| 2015/0002462 A1 | 1/2015 | Zhao et al. | |
| 2015/0130747 A1* | 5/2015 | Tsai | G06F 3/0412 345/174 |

FOREIGN PATENT DOCUMENTS

| | | |
|---|---|---|
| CN | 102945093 A | 2/2013 |
| CN | 202795299 U | 3/2013 |
| CN | 103207720 A | 7/2013 |

OTHER PUBLICATIONS

First Chinese Office Action dated Oct. 23, 2015; Appln. No. 201310446156.8.
Second Chinese Office Action dated Jun. 1, 2016; Appln. No. 201310446156.8.
International Preliminary report on Patentability Appln. No. PCT/CN2013/088151; Dated Mar. 29, 2016.

* cited by examiner

TOUCH DISPLAY DEVICE AND DRIVING METHOD THEREOF

TECHNICAL FIELD

The present disclosure relates to the display technical field, and particularly to a touch display device and a driving method thereof.

BACKGROUND

A digitized apparatus has become an indispensable key element for the life and production of people. A display device as an output terminal of a video signal of a digital apparatus is used for delivering directly information to an operator and belongs to an indispensable device. Along with the development of science and technology, the function of the display device is not only restricted to receiving a video signal to display, but also has a control command input function, that is, the existing touch display device can even replace an accessory apparatus for input, such as a keyboard, by directly inputting a command through a screen.

The inventor finds in the implementation of the present disclosure that, in the related art, the touch display device only performs scanning during the interval between the refreshing of two frames of pictures, and detects whether there is a touch signal from a user. But the detecting mode of the touch signal makes the time for scanning the touch signal less, which results in that the touch display device is sometimes unable to receive the touch command from the user effectively, degrading the use experience of the user.

SUMMARY

The technical problem to be solved by the embodiment of the present disclosure is to provide a touch display device and a driving method thereof capable of extending the time for the touch display device to perform touch control.

In order to solve the above technical problem, the embodiment of the present disclosure adopts the following technical solution:

A first aspect of the present disclosure provides a driving method of a touch display device which includes n rows of pixels and divides the n rows of pixels into several display regions, wherein n is a natural number greater than 1, the driving method of the touch display device comprising:

after the touch display device sends a display signal to the $i^{th}$ row of pixels, and before the touch display device sends a display signal to the $(i+1)^{th}$ row of pixels, sending a touch control signal, by the touch display device, to perform touch control on one display region thereamong, wherein $1 \le i < n$.

Moreover, after the touch display device sends a display signal to the $i^{th}$ row of pixels, and before the touch display device sends a display signal to the $(i+1)^{th}$ row of pixels, sending a touch control signal, by the touch display device, to perform touch control on one display region thereamong comprises:

after the touch display device sends a display signal to the $i^{th}$ row of pixels, and before the touch display device sends a display signal to the $(i+1)^{th}$ row of pixels, sending a sync control signal by the touch display device; and sending a touch control signal according to the sync control signal by the touch display device to perform touch control on one display region thereamong.

Moreover, the driving method further comprises: when a frame of display picture starts to display, further sending a trigger signal by the touch display device to trigger the display signal and the sync control signal.

Moreover, after a display module sends a high level display signal to the $i^{th}$ row of pixels, and before the display module sends a high level display signal to the $(i+1)^{th}$ row of pixels, the touch display device sends a low level sync control signal.

Moreover, any of the display regions continuously receives at least 16 touch control signals.

In the technical solution of the embodiment of the present disclosure, the touch display device inserts a touch control signal between the display signals of two rows of pixels, which is equivalent to that the touch control signal and display signal of the touch display device are sent alternately, allowing the time for the touch display device to perform touch control to distribute uniformly in a display time of a frame of display picture, which is equivalent to extending time for the touch display device to perform touch control, reducing possibility that the touch display device is unable to receive a touch control command from a user effectively, and ensuring use experience of the user.

A second aspect of the embodiment of the present disclosure provides a touch display device which includes n rows of pixels and divides the n rows of pixels into several display regions, wherein n is a natural number greater than 1, the touch display device further comprises:

a display module configured to send a display signal to the $i^{th}$ row of pixels, wherein $1 \le i < n$;

a touch control module configured to, after the display module sends a display signal to the $i^{th}$ row of pixels, and before the display module sends a display signal to the GAP row of pixels, send a touch control signal to perform touch control on one display region thereamong.

Moreover, the touch display device further comprises:
a sync control module configured to, after the display module sends a display signal to the $i^{th}$ row of pixels, and before the display module sends a display signal to the $(i+1)^{th}$ row of pixels, send a sync control signal, wherein the touch control module sends a touch control signal according to the sync control signal to perform touch control on one display region thereamong.

Moreover, the touch display device further comprises:
a triggering module configured to when a frame of display picture starts to display, send a trigger signal to trigger the display module and the sync control module.

Moreover, after the display module sends a high level display signal to the $i^{th}$ row of pixels, and before the display module sends a high level display signal to the $(i+1)^{th}$ row of pixels, the sync control module sends a low level sync control signal.

Moreover, any of the display regions continuously receives at least 16 touch control signals.

In the technical solution of the embodiment of the present disclosure, the touch control module of the touch display device inserts a touch control signal between the display signals of two rows of pixels, which is equivalent to that the touch control signal and display signal of the touch display device are sent alternately, allowing the time for the touch display device to perform touch control to distribute uniformly in a display time of a frame of display picture, which is equivalent to extending time for the touch display device to perform touch control, reducing possibility that the touch display device is unable to receive a touch control command from a user effectively, and ensuring use experience of the user.

BRIEF DESCRIPTION OF THE DRAWINGS

In order to more clearly illustrate the technical solution in the embodiment of the present invention or related art, the drawings necessary in the description of the embodiment will be introduced briefly below. Obviously, the drawings in the following description are only some embodiments of the present invention, and for those ordinary skilled in the art, other drawings can be further obtained based on these drawings without creative works.

DETAILED DESCRIPTION

The technical solution in the embodiments of the present invention will be described clearly and completely below in conjunction with the drawings in the embodiments of the present invention. Obviously, the described embodiments are only a part of the embodiments of the present invention instead of all the embodiments. Based on the embodiments in the present invention, all other embodiments obtained by those ordinary skilled in the art without creative work belong to the protection scope of the present invention.

Embodiment 1

Figure 1:
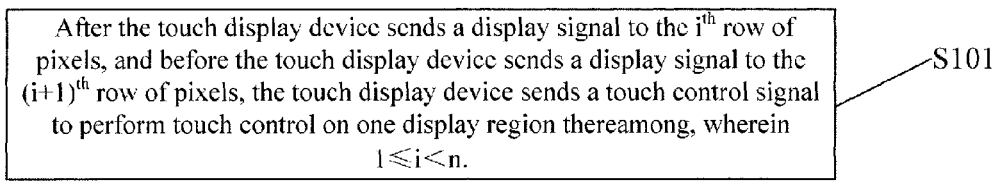
FIG. 1 is a flow diagram 1 of a driving method of a touch display device in an embodiment of the present disclosure.

The embodiment of the present disclosure provides a driving method of a touch display device which includes n rows of pixels and divides the n rows of pixels into several display regions, wherein n is a natural number greater than 1. FIG. 1 is a flow diagram 1 of a driving method of a touch display device in an embodiment of the present disclosure. As shown in FIG. 1, the driving method of the touch display device includes:

Step S101: after the touch display device sends a display signal to the $i^{th}$ row of pixels, and before the touch display device sends a display signal to the $(i+1)^{th}$ row of pixels, sending a touch control signal, by the touch display device, to perform touch control on one display region thereamong, wherein $1 \leq i < n$.

That is, in the embodiment of the present disclosure, the touch display device inserts a touch control signal between the display signals of two rows of pixels, which is equivalent to that the touch control signal and display signal of the touch display device are sent alternately, allowing the time for the touch display device to perform touch control to distribute uniformly in a display time of a frame of display picture, which is equivalent to extending time for the touch display device to perform touch control, reducing possibility that the touch display device is unable to receive a touch control command from a user effectively, and ensuring use experience of the user.

Moreover, the driving method can further prevent the mutual interference between the touch control signal and display signal of the touch display device from affecting the normal work of the touch display device.

In order to ensure the normal performing of the touch control of the touch display device, the touch control time for each display region can not be too short. Usually, each display region corresponds to a plurality of touch control signals, to ensure each display region can obtain a touch control operation of a user in time and effectively.

Figure 2:
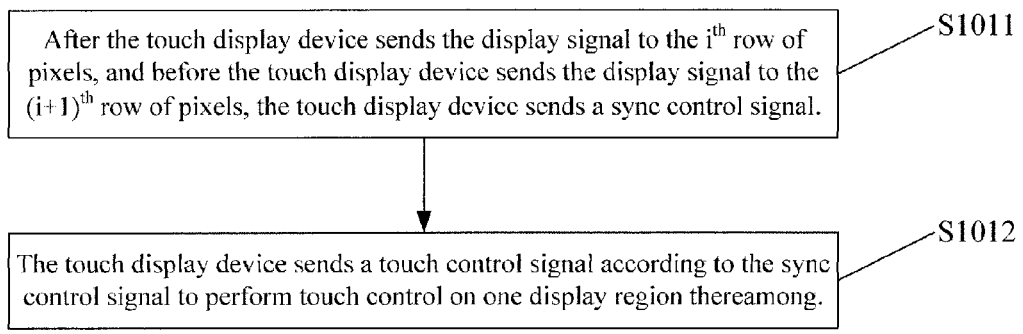
FIG. 2 is a flow diagram 2 of a driving method of a touch display device in an embodiment of the present disclosure.

Moreover, FIG. 2 is a flow diagram 2 of a driving method of a touch display device in an embodiment of the present disclosure. As shown in FIG. 2, the step S101 specifically includes:

Step S1011: after the touch display device sends a display signal to the $i^{th}$ row of pixels, and before the touch display device sends a display signal to the $(i+1)^{th}$ row of pixels, sending a sync control signal by the touch display device.

Step S1012: sending a touch control signal according to the sync control signal by the touch display device to perform touch control on one display region thereamong.

Specifically, when the sync control signal comes, the touch display device sends a touch control signal to perform touch control on a certain display region; and when the sync control signal pauses to be sent, the touch display device also pauses to send a touch control signal, the frequency and valid time of the touch control signal and the sync control signal is equal.

When a frame of display picture starts to display, the touch display device further sends a trigger signal to trigger the display signal and the sync control signal, so that the touch display device can normally output the display signal and the sync control signal, thus normally performing display and touch control.

Specifically, in the related art, when a frame of display picture starts to display, the trigger signal sent by the touch display device is only used for indicating the start of a display signal of the touch display device, which means that after the trigger signal is sent out, the display signal first sent by the touch display device corresponds to the first row of pixels, and the touch display device subsequently send display signals corresponding to the second row of pixels, the third row of pixels, . . . , the last row of pixels, until each row of pixels of the touch display device receive a corresponding display signal, that is, the display of a frame of display picture of the touch display device completes.

And in the embodiment of the present disclosure, when a high level of the trigger signal emerges, it not only means a frame of display picture starts to display, but also triggers the sync control signal sends a high level meantime, at which time, the sync control signal synchronizes and aligns the touch control action and display action of the touch display device according to the trigger signal, thus capable of eliminating sync errors and allowing the touch control action and display action to be performed alternatively.

Specifically, each time a first rising edge of the sync control signal comes, the touch display device makes a calibration one time between the touch control action and the display action, which means that the sync control signal sent first after the trigger signal completes corresponding to a first display region, and then the touch display device sends a sync control signal to each display region in turn.

Figure 3:
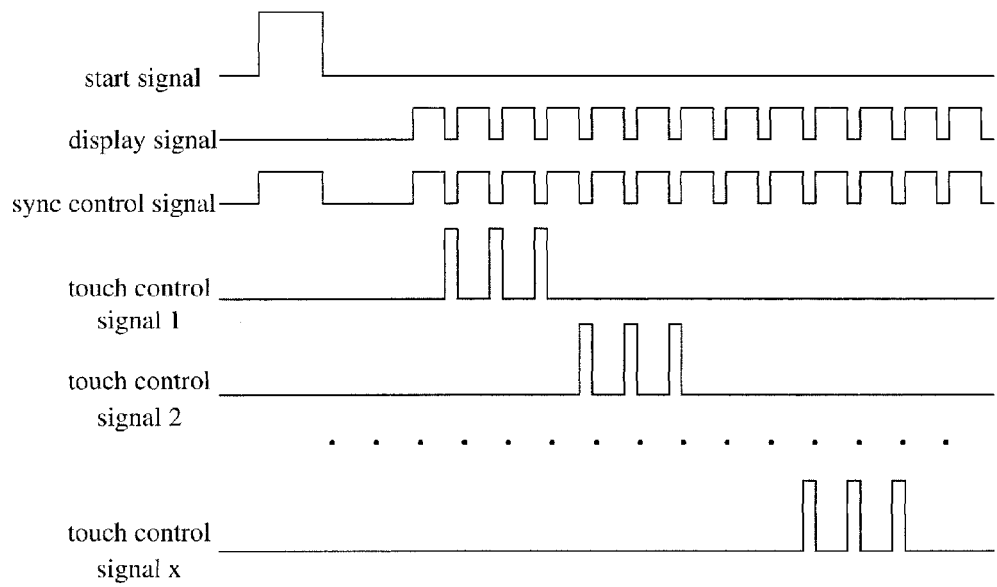
FIG. 3 is a driving timing chart of a touch display device in an embodiment of the present disclosure.

FIG. 3 is a driving timing chart of a touch display device in an embodiment of the present disclosure. Specifically, the driving method of the touch display device will be described by using the timing chart of FIG. 3.

When a frame of display picture starts to display, the touch display device sends a trigger signal STV, which trigger the emersion of the first high level of the sync control signal while triggering the display signal. The start time and duration of the first high level of the sync control signal consist with those of the trigger signal, so as to facilitate the touch display device to synchronize and align the display action and the touch control action.

As shown in FIG. 3, the waveform of the display signal and the waveform of the sync control signal are completely identical. In order to prevent the mutual interference between the touch control signal and the display signal from effecting the normal work of the touch display device, it can be implemented by controlling the waveforms of the sync control signals which the display signal and the touch control signal correspond to respectively, i.e., when the waveform of the sync control signal changes, the touch display device switches between the touch control signal and the display signal.

In the embodiment of the present disclosure, what the high level of the sync control signal corresponds to is the display signal, i.e., the high level of the sync control signal consists with the display signal; then the touch control signal can be made effective when the sync control signal is at the low level, that is, after the display module sends a high level display signal to the $i^{th}$ row of pixels, and before the display module sends a high level display signal to the $(i+1)^{th}$ row of pixels, the touch display device sends a sync control signal of low level, and the valid times of the display signal and the touch control signal are complementary, thus capable of ensuring the times when the touch display device performs display and touch control are alternative, preventing the display signal being interfered to influence the display effect of the touch display device.

It should be noted that, since the trigger signal comes when a frame of display picture starts to display while the sync control signal sends a high level signal, the durations of the high level signal and the trigger signal are identical, but their durations are much greater than those high levels of other sync control signals corresponding to the display signals. In order to ensure the touch control signal and the display signal to be sent alternatively, the touch display device can determine whether the duration of the high level of the sync control signal is basically equal to a preset time which is the duration of each display signal. When the duration of the high level of the sync control signal is basically equal to the preset time, it indicates that the touch display device just outputs a display signal and the touch display device may output a touch control signal; otherwise, it indicates that the touch display device is at fault or the high level is the high level to be used to align with the trigger signal, and the touch display device will not output a touch control signal.

It should be noted that, in the related art, the touch display device usually obtains the touch control operation of the user by using a continuous touch control signal during a certain continuous period, but the touch display device usually obtains the touch control operation of the user by way of sampling, thus providing a corresponding feedback. The sampling is a process for transforming a continuous magnitude of time domain or space domain into a discrete magnitude, and when the number of the samples is great enough, the touch display device can accurately detect the touch control operation of the user.

While in the embodiment of the present disclosure, a touch control signal is inserted into every two display signals, which means that, the touch control signals are discrete signals, each touch control signal is similar to a sample for the touch display device, and when the number of the touch control signals corresponding to each display region is great enough, i.e., the number of the samples is great enough, the touch display device can accurately detect the touch control operation of the user as in the related art; or, the touch display device can also collect and combine the information fed back from a display region during a certain period, to make the information form a continuous signal, and then performs corresponding processing and analysis on the signal.

It should be noted that, the touch control signal 1 in FIG. 3 represents the touch control signal allocated to the first display region. It can be known that the touch control signal 2 represents the touch control signal allocated to the second display region, and the touch control signal x represents the touch control signal allocated to the $x^{th}$ display region.

Specifically, the description will be made by taking a touch display device of a resolution of 1280*720 as an example. When displaying each frame of display picture, the touch display device needs to scan 720 pixel rows one by one, which means that, the touch display device will output 720 display signals; because one touch control signal is output between two display signals, it means that the touch display device will output 720 touch control signals. Assuming that the touch display device includes 9 display regions at this time, the 720 touch control signals are allocated to each of the 9 display regions uniformly, that is, it means that each display region can obtain 80 touch control signals altogether. Allocating the touch control signals reasonably and changing the number of the touch control signals continuously obtained by each display region each time can change the report rate of the touch display device. For example, each display region continuously obtains 40 touch control signals each time, and then the touch display device sends continuously 40 touch control signals corresponding to the next display region, until the sending for each display region completes. At this time, the frame of display picture has not completed the display, thus the touch display device starts again from the first display region, and sends to each display region 40 continuous touch control signals until the last display region, at which time a frame of display picture completes the display exactly. It can be known that, in the process of displaying each frame of display picture, each display region of the touch display device completes two times of reporting points. Obviously, the report rate of the touch display device is two times of the display frequency, which means that, if the display frequency is 60 Hz, then the report rate is 120 Hz.

If the number of the touch control signals obtained by the display region each time is reduced, then the report rate of the touch display device can be increased. For example, each display region obtains 32 touch control signals continuously each time, and then the report rate of the touch display device is four times of the display frequency, which means that, if the display frequency is 60 Hz, then the report rate is 240 Hz. Compared to the common report rate of 60 Hz or 120 Hz in the related art, the report rate of the touch display device is greatly enhanced, lowering the possibility that the touch display device is unable to effectively detect and obtain the touch control command of the user, enhancing the fluency of the interaction between the touch display device and the user, and improving the use experience of the user.

It should be noted that, in the embodiment of the present disclosure, the number of the touch control signals obtained continuously by each display region each time can be set according to the practical condition. However, it should be ensured that each of the display regions continuously receives at least 16 touch control signals, thus capable of ensuring the touch display device is able to accurately obtain the touch control operation of the user.

Therein, if the touch display device scans one row of pixels one time, then the display signal in the embodiment of the present disclosure is a grid line drive signal; if the touch display device scans a plurality of rows of pixels simultaneously, then the display signal in the embodiment of the present disclosure is a charging signal for charging correctly each row of pixels.

Figure 4:
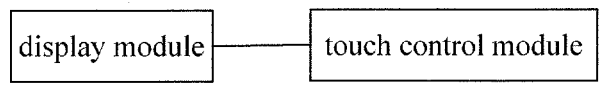
FIG. 4 is a schematic structural diagram 1 of a touch display device in an embodiment of the present disclosure.

Moreover, the embodiment of the present disclosure further provides a touch display device for driving by using the above mentioned driving method, the touch display device includes n rows of pixels and divides the n rows of pixels into several display regions, wherein n is a natural number greater than 1. FIG. 4 is a schematic structural diagram 1 of a touch display device in an embodiment of the present disclosure. As shown in FIG. 4, the touch display device further includes:

a display module configured to send a display signal to the $i^{th}$ row of pixels, wherein $1 \leq i < n$;

a touch control module configured to, after the display module sends a display signal to the $i^{th}$ row of pixels, and before the display module sends a display signal to the $(i+1)^{th}$ row of pixels, send a touch control signal to perform touch control on one display region thereamong.

In the technical solution of the embodiment of the present disclosure, the touch control module of the touch display device inserts a touch control signal between the display signals of two rows of pixels, which is equivalent to that the touch control signal of the touch display device and the display signal are sent alternately, allowing the time for the touch display device to perform touch control to distribute uniformly in a display time of a frame of display picture, which is equivalent to extending time for the touch display device to perform touch control, reducing possibility that the touch display device is unable to receive a touch control command from a user effectively, and ensuring use experience of the user.

Figure 5:
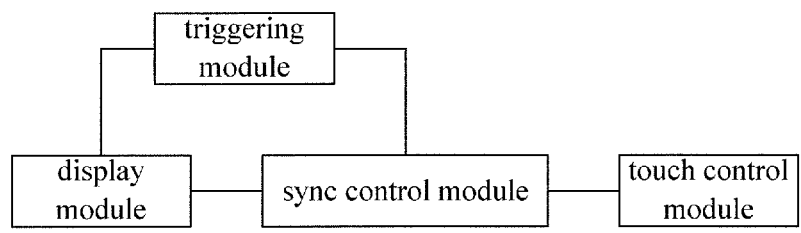
FIG. 5 is a schematic structural diagram 2 of a touch display device in an embodiment of the present disclosure.

Moreover, FIG. 5 is a schematic structural diagram 2 of a touch display device in an embodiment of the present disclosure. As shown in FIG. 5, the touch display device further includes:

a sync control module configured to, after the display module sends a display signal to the $i^{th}$ row of pixels, and before the display module sends a display signal to the $(i+1)^{th}$ row of pixels, send a sync control signal.

Specifically, the touch control module sends a touch control signal according to the sync control signal to perform touch control on one display region thereamong.

The touch display device further includes a triggering module configured to when a frame of display picture starts to display, send a trigger signal to start the display module and the sync control module.

Further, as known from FIG. 3 and the description of the above text, after the display module sends a high level display signal to the $i^{th}$ row of pixels, and before the display module sends a high level display signal to the $(i+1)^{th}$ row of pixels, the sync control module sends a low level sync control signal.

In the embodiment of the present disclosure, any of the display regions continuously receives at least 16 touch control signals.

What is described above is only the specific implementation mode of the present invention, but the protection scope of the present invention is not limited thereto. In the technical scope disclosed by the present invention, any skilled in the art can readily conceive alternations or replacements which are all covered in the protection scope of the present invention. Thus, the protection scope of the present invention is subject to the protection scope of the claims.

The invention claimed is:

1. A driving method of a touch display device which includes n rows of pixels and divides the n rows of pixels into several display regions, wherein n is a natural number greater than 1, the driving method of the touch display device comprising:

after the touch display device sends a display signal to the $i^{th}$ row of pixels, and before the touch display device sends a display signal to the $(i+1)^{th}$ row of pixels, sending a touch control signal, by the touch display device, to perform touch control on one display region thereamong, wherein $1 \leq i < n$, wherein after the touch display device sends the display signal to the $i^{th}$ row of pixels, and before the touch display device sends the display signal to the $(i+1)^{th}$ row of pixels, sending the touch control signal, by the touch display device, to perform touch control on one display region thereamong comprises:

after the touch display device sends a display signal to the $i^{th}$ row of pixels, and before the touch display device sends a display signal to the $(i+1)^{th}$ row of pixels, sending a sync control signal by the touch display device; and determining by the touch display device whether a duration of a high level of the sync control signal is equal to a preset time, when the duration of the high level of the sync control signal is equal to the preset time, sending a touch control signal according to a low level of the sync control signal by the touch display device to perform touch control on one display region thereamong, and when the duration of the high level of the sync control signal is not equal to the preset time, not outputting a touch control signal by the touch display device.

2. The driving method of claim 1, further comprising: when a frame of display picture starts to display, further sending a trigger signal by the touch display device to trigger the display signal and the sync control signal.

3. The driving method of claim 2, wherein the number of the touch control signals received continuously by any of the display regions each time is at least 16.

4. The driving method of claim 1, wherein after the display module sends a high level display signal to the $i^{th}$ row of pixels, and before the display module sends a high level display signal to the $(i+1)^{th}$ row of pixels, the touch display device sends a low level sync control signal.

5. The driving method of claim 4, wherein the number of the touch control signals received continuously by any of the display regions each time is at least 16.

6. The driving method of claim 1, wherein the number of the touch control signals received continuously by any of the display regions each time is at least 16.

7. The driving method of claim 1, wherein the number of the touch control signals received continuously by any of the display regions each time is at least 16.

8. A touch display device which includes n rows of pixels and divides the n rows of pixels into several display regions, wherein n is a natural number greater than 1, the touch display device further comprising:

a display module configured to send a display signal to the row of pixels, wherein $1 \leq i < n$, a touch control module configured to, after the display module sends a display signal to the $i^{th}$ row of pixels, and before the display module sends a display signal to the $(i+1)^{th}$ row of pixels, send a touch control signal to perform touch control on one display region thereamong; a sync control module configured to, after the display module sends the display signal to the $i^{th}$ row of pixels, and before the display module sends the display signal to the (i+1)$^{th}$ row of pixels, send a sync control signal, wherein the touch control module determines whether a duration of a high level of the sync control signal is equal to a preset time, when the duration of the high level of the sync control signal is equal to the preset time, sends a touch control signal according to a low level of the sync control signal to perform touch control on one display region thereamong, and when the duration of the high level of the sync control signal is not equal to the preset time, does not output a touch control signal.

9. The touch display device of claim 8, further comprising:
a triggering module configured to, when a frame of display picture starts to display, send a trigger signal to trigger the display module and the sync control module.

10. The touch display device of claim 9, wherein the number of the touch control signals received continuously by any of the display regions each time is at least 16.

11. The touch display device of claim 8, wherein after the display nodule sends a high level display signal to the i$^{th}$ row of pixels, and before the display module sends a high level display signal to the (i+1)$^{th}$ row of pixels, the sync control module sends a low level sync control signal.

12. The touch display device of claim 11, wherein the number of the touch control signals received continuously by any of the display regions continuously is at least 16.

13. The touch display device of claim 8, wherein the number of the touch control signals received continuously by any of the display regions each time is at least 16.

14. The touch display device of claim 8, wherein the number of the touch control signals received continuously by any of the display regions each time is at least 16.

* * * * *